United States Patent
Barrios et al.

(10) Patent No.: US 7,555,173 B2
(45) Date of Patent: Jun. 30, 2009

(54) ELECTRO-OPTIC MODULATOR ON RIB WAVEGUIDE

(75) Inventors: Carlos Angulo Barrios, Toledo (ES); Michal Lipson, Ithaca, NY (US); Vilson Rosa de Almeida, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 10/821,627

(22) Filed: Apr. 9, 2004

(65) Prior Publication Data

US 2005/0089257 A1    Apr. 28, 2005

Related U.S. Application Data

(60) Provisional application No. 60/461,705, filed on Apr. 9, 2003.

(51) Int. Cl.
 *G02F 1/035* (2006.01)
(52) U.S. Cl. ............................................. 385/2; 385/14
(58) Field of Classification Search .................... 385/2, 385/8, 40, 129–132; 359/245, 247, 248, 359/276
See application file for complete search history.

(56) References Cited

U.S. PATENT DOCUMENTS

| | | | |
|---|---|---|---|
| 5,132,981 A * | 7/1992 | Uomi et al. ................... 372/45 |
| 5,308,785 A * | 5/1994 | Comfort et al. ............. 438/429 |
| 5,563,902 A * | 10/1996 | Xu et al. ................... 372/50.11 |
| 6,351,326 B1 * | 2/2002 | Morse et al. ................ 359/245 |
| 6,545,791 B1 * | 4/2003 | McCaughan et al. ........ 359/245 |
| 6,788,727 B2 * | 9/2004 | Liu ............................ 372/102 |
| 6,876,050 B2 * | 4/2005 | Morse ........................ 257/432 |

FOREIGN PATENT DOCUMENTS

WO   WO 2079863 A2 * 10/2002

* cited by examiner

*Primary Examiner*—Sung H Pak
(74) *Attorney, Agent, or Firm*—Schwegman, Lundberg & Woessner P.A.

(57) ABSTRACT

An electro-optic modulator is formed on a silicon-on-insulator (SOI) rib waveguide. An optical field in the modulator is confined by using an electrically modulated microcavity. The microcavity has reflectors on each side. In one embodiment, a planar Fabry-Perot microcavity is used with deep $Si/SiO_2$ Bragg reflectors. Carriers may be laterally confined in the microcavity region by employing deep etched lateral trenches. The refractive index of the microcavity is varied by using the free-carrier dispersion effect produced by a p-i-n diode formed about the microcavity. In one embodiment, the modulator confines both optical field and charge carriers in a micron-size region.

25 Claims, 4 Drawing Sheets

ELECTRO-OPTIC MODULATOR ON RIB WAVEGUIDE

RELATED APPLICATION

This application claims priority to U.S. Provisional Application Ser. No. 60/461,705 (entitled Low-Power-Consumption Short-Length and High-Modulation-Depth Silicon Electro-Optic Modulator, filed Apr. 9, 2003) which is incorporated herein by reference.

GOVERNMENT FUNDING

The invention described herein was made with U.S. Government support under Contract Number F49620-02-1-0396 awarded by Defense Advanced Research Project Agency. The United States Government has certain rights in the invention.

FIELD OF THE INVENTION

The present invention relates to an electro-optic modulator, and in particular to an electro-optic modulator formed on a rib waveguide.

BACKGROUND OF THE INVENTION

Silicon-based photonic components working at 1.3 and 1.55-μm fiber-optic communications-wavelengths for fiber-to-home interconnects and local area networks (LAN) are a subject of intensive research because of the possibility of integrating optical elements and advanced electronics together on a silicon substrate using bipolar or complementary metal-oxide semiconductor (CMOS) technology. The resulting optoelectronic integrated circuit (OEIC) should exhibit a better performance than optical and electrical circuits when considered separately, and present a significantly lower cost than those based on III-V semiconductor materials.

Si passive structures, such as waveguides, couplers and filters have been extensively studied. Less work has been reported on Si active (or tunable) integrated devices such as modulators and switches, despite their importance as means of manipulating light beams for information processing (e.g., coding-decoding, routing, multiplexing, timing, logic operations, etc) in integrated-optic circuits. Some Si-based thermo-optic and electro-optic active devices have been demonstrated. In thermo-optic devices, the refractive index of Si is modulated by varying the temperature, inducing a phase modulation which in turn is used to produce an intensity modulation at the output of the device. For Si, the thermal change of the real optical refractive index is large. Nevertheless, the thermo-optic effect is rather slow and can only be used up to 1 MHz modulation frequencies. For higher modulation frequencies, up to few hundreds of MHz, electro-optic devices are required.

Most of the proposed electro-optic devices exploit the free carrier dispersion effect to change both the real refractive index and optical absorption coefficient. This is because the unstrained pure crystalline Si does not exhibit linear electro-optic (Pockels) effect and the refractive index changes due to the Franz-Keldysh effect and Kerr effect are very weak. In free-carrier absorption modulators (FCAM), changes in the optical absorption of the structure are directly transformed into an output intensity modulation. Phase modulation in a specific region of optical devices, such as Mach-Zehnder modulators, total-internal-reflection (TIR) based structures, cross-switches, Y-switches and Fabry-Perot (F-P) resonators, is also used to modulate the output intensity.

Free-carrier concentration in electro-optic devices can be varied by injection, accumulation, depletion or inversion of carriers. Si-based electro-optic modulators based on p-i-n diodes, metal-oxide-semiconductor field-effect-transistors (MOSFET) and bipolar-mode-field-effect-transistor (BM-FET) structures have been proposed. Most silicon electro-optic intensity modulators and switches present some common features: they require long interaction distances and injection current densities higher than 1 kA/cm$^2$ in order to obtain a significant modulation depth. Long interaction lengths are undesirable in order to achieve high levels of integration and miniaturization for fabricating low-cost compact chips. High current densities may induce thermo-optic effect due to heating of the structure, and cause an opposite effect on the refractive index change as that produced by free-carrier dispersion, reducing its effectiveness. There is therefore an urgent need, from the integration point of view, for structures that can be implemented in a micron-size region offering low current density, low power consumption and high-modulation-depth.

SUMMARY OF THE INVENTION

An electro-optic modulator is formed on a silicon-on-insulator (SOI) rib waveguide. An optical field in the modulator is confined by using an electrically modulated microcavity. The microcavity has reflectors on each side. In one embodiment, a planar Fabry-Perot microcavity is used with deep Si/SiO$_2$ Bragg reflectors. Carriers may be laterally confined in the microcavity region by employing deep etched lateral trenches. The refractive index of the microcavity is varied by using the free-carrier dispersion effect produced by a p-i-n diode formed about the microcavity. In one embodiment, the modulator confines both optical field and charge carriers in a micron-size region.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Figure 1:
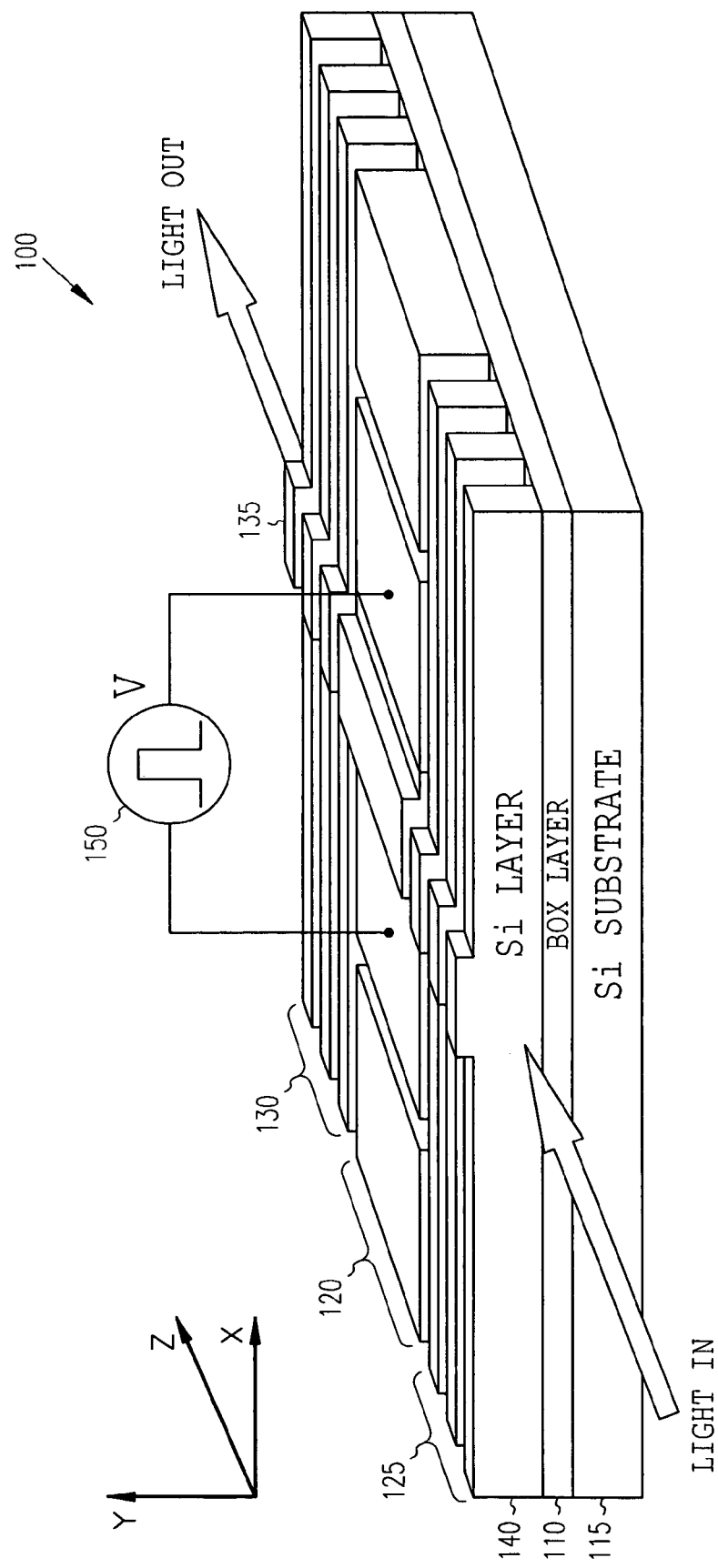
FIG. 1 shows a perspective block schematic view of a partially finished electro-optic modulator according to an embodiment of the invention.

FIG. 1 shows a perspective block schematic view of a partially finished electro-optic modulator 100. The structure will be described first, followed by a fabrication description and a description of potential operating principles and characteristics of various embodiments. For ease of illustration, an SiO$_2$ layer covering the modulator 100 is not shown in FIG. 1. The modulator 100 is formed on a buried oxide (BOX) layer 110 supported by a silicon substrate 115. The modulator 100 consists of a Fabry-Perot (F-P) 120 cavity formed by two distributed Bragg reflectors (DBRs) 125, 130 in a SOI rib waveguide 135. Other types of reflectors may be used in further embodiments.

Figure 2:
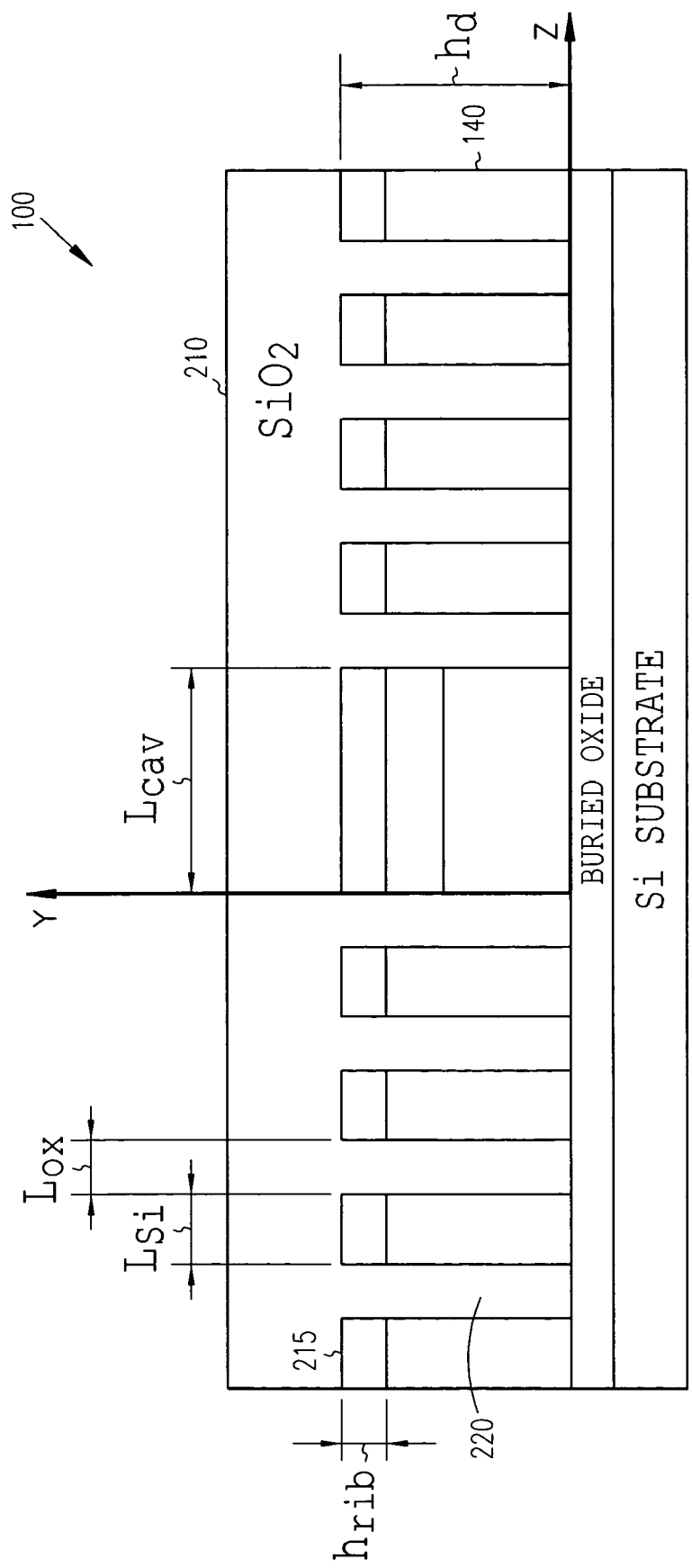
FIG. 2 shows a cross section view of the modulator of FIG. 1 according to an embodiment of the invention.

Some typical dimensions and doping for the modulator 100 are shown in FIG. 2, in which an SiO$_2$ layer 210 covering the modulator 100 is shown. A top silicon layer 140 (device layer) is approximately 1.5-μm-high (h$_d$) with a n-type background doping concentration of $10^{15}$ cm$^{-3}$. Both DBRs 125, 130 consist of the same number of Si/SiO$_2$ periods down to the BOX layer 110. The DBRs are formed of alternating Si and SiO$_2$ regions as indicated at 215 and 220 respectively. The length of the Si and SiO$_2$ regions is denoted as L$_{Si}$ and L$_{ox}$, respectively.

Figure 3:
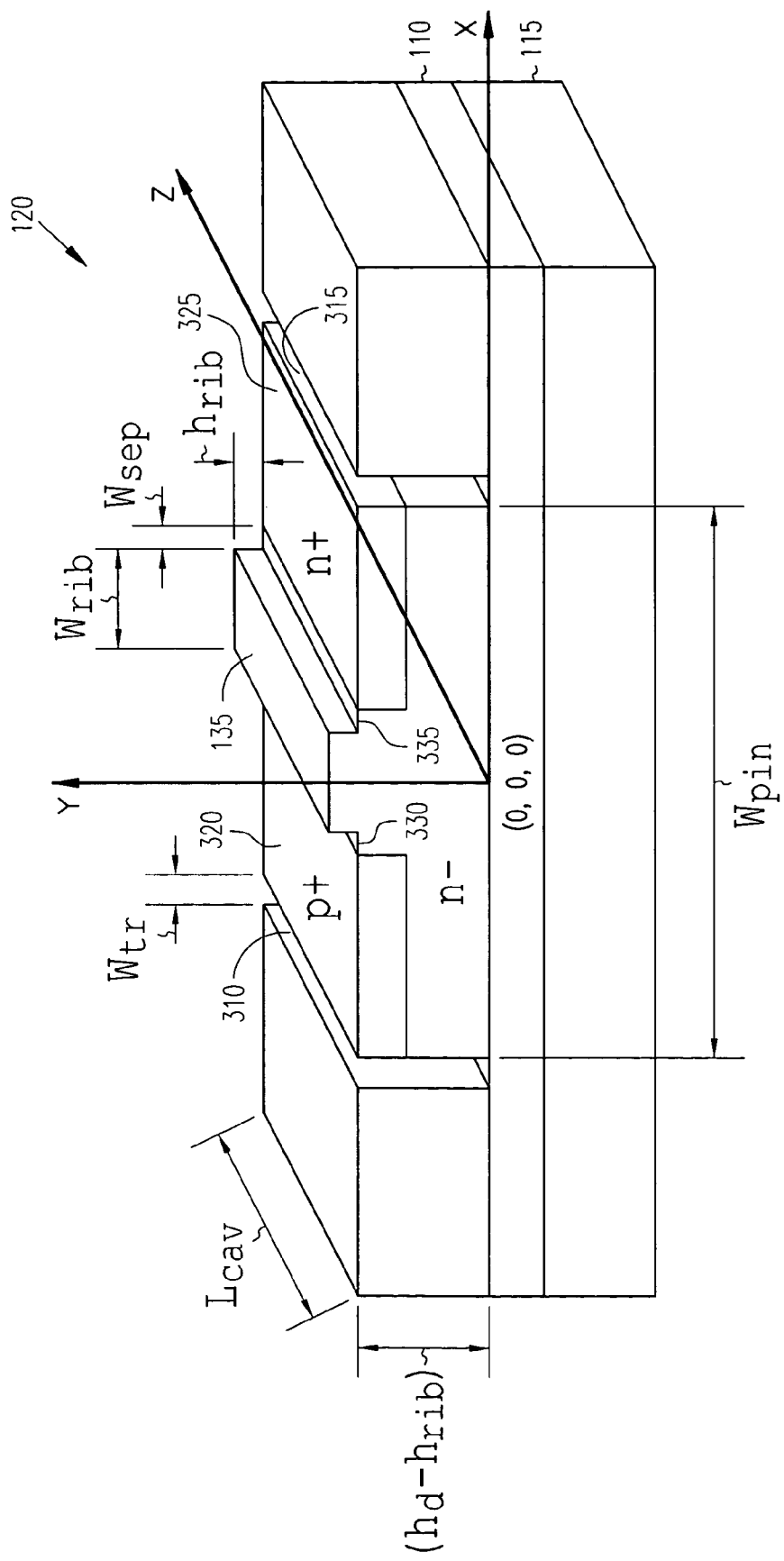
FIG. 3 shows a schematic perspective diagram of a cavity region according to an embodiment of the invention.

FIG. 3 shows a schematic perspective diagram of the cavity 120 region. As in FIG. 1, the covering layer of SiO$_2$ is not shown for better visualization. The rib 135 width and height are chosen to be approximately w$_{rib}$=1.5 μm and h$_{rib}$=0.45 μm, respectively. Two lateral trenches 310, 315 down to the BOX layer 110 are formed on sides of the rib with a width of approximately w$_{tr}$=150 nm. The lateral trenches are substantially transverse to the Si and SiO$_2$ regions of the DBRs in one embodiment, and substantially parallel to the rib waveguide 135. The width of the cavity region 120 delimited by the lateral trenches 310, 315 is W$_{pin}$. Heavily doped p$^+$ and n$^+$ regions 320 and 325 are defined in the cavity region, at both sides of the rib 135, separated the rib by regions 330, 335 w$_{sep}$=0.5 μm from the corresponding rib edge and extended to the corresponding lateral trenches. These highly-doped regions form p and n portions of a p-i-n diode above the cavity under the rib waveguide 135. Conductors and a voltage source 150 are coupled to the heavily doped regions. The voltage is then used to modulate light passing through the modulator 100.

A Gaussian doping profile is assumed for both highly-doped regions with a maximum peak concentration of approximately $10^{20}$ cm$^{-3}$ at y=[(h$_d$-h$_{rib}$)-0.01 μm]=1.04 μm, located along a line from x=(W$_{pin}$/2) to x=[(w$_{rib}$/2)+w$_{sep}$] for one doped region and from x=-(W$_{pin}$/2) to x=-[(w$_{rib}$/2)+w$_{sep}$] for the other one, and a standard deviation along the y-axis of 0.05 μm. At x>-[(w$_{rib}$/2)+w$_{sep}$] for one doped region and x<[(w$_{rib}$/2)+w$_{sep}$] for the other one, the doping drops off laterally (along the x-axis) with a standard deviation of 0.035 μm. The length of the highly-doped regions is equal to that of the cavity (L$_{cav}$). Metal electrodes contact both the p$^+$ (anode) and n$^+$ (cathode) regions of the p-i-n diode with the same width and length as those. A planar silicon dioxide layer 210 covering the whole structure has been assumed.

The microcavity provides for the confinement and enhancement of the optical field in a very small region. The transmission of these structures is highly sensitive to small index changes in the cavity, making microcavities adequate for intensity modulation applications in a short length. In addition, since the refractive index modulation can be confined to the cavity region, the electrical power to produce the desired phase change can be made very small.

Figure 4:
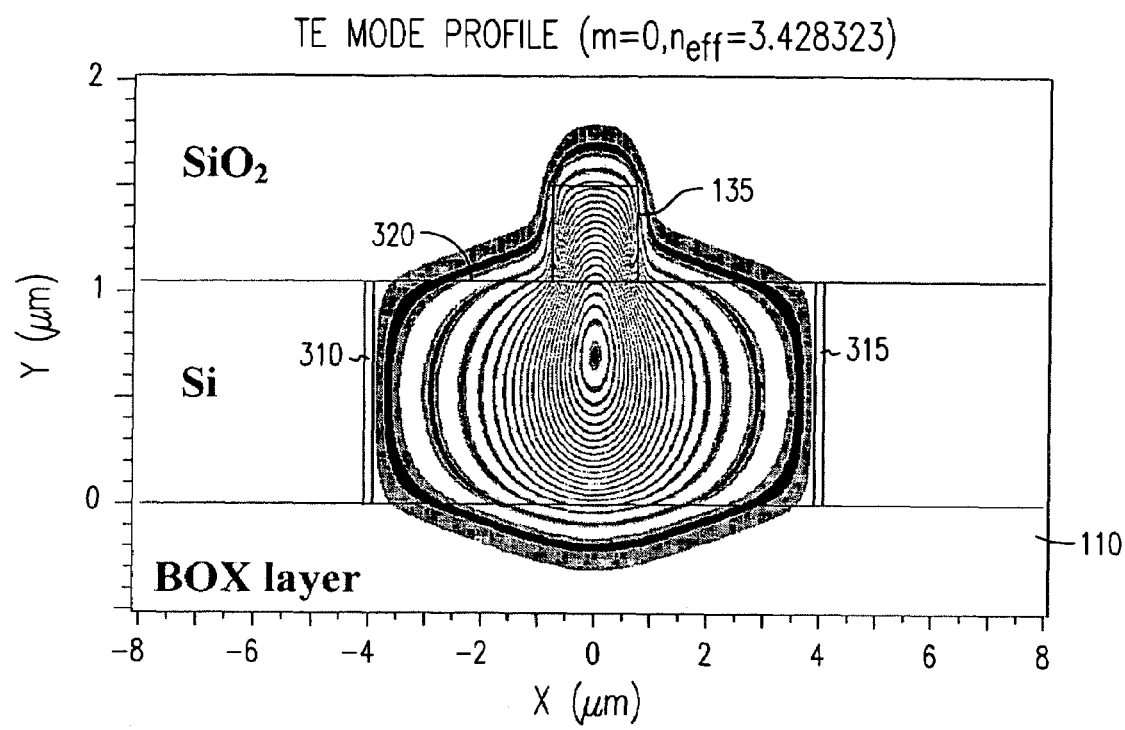
FIG. 4 shows an example TE$_{00}$ mode distribution in the cavity region according to an embodiment of the invention.

Carrier confinement in the active region of the electro-optic device helps to optimize the device performance. The confinement is illustrated in FIG. 4, which shows an example TE$_{00}$ mode distribution in the cavity for W$_{pin}$=8 μm, h$_{rib}$=0.45 μm, w$_{rib}$=1.5 μm and hd=1.5 μm. In one embodiment, the use of lateral trench isolation 310, 315 in a silicon p-i-n phase modulator may improve both the dc and transient device performances. This is because the lateral carrier diffusion that does not contribute to alter the refractive index in the central active region of the modulator is reduced, allowing a better use of the injected carriers. In addition, carrier confinement permits high scale integration due to electrical isolation between neighbor devices.

Formation of the electro-optic modulation device 100 may utilize different processes. In one embodiment, a pattern for the trenches of the distributed Bragg reflectors 125 and 130, and the cavity isolation trenches 310 and 315 is defined by e-beam lithography in an oxide file grown on silicon layer 140. The trenches are etched down to the buried oxide layer 110 by reactive ion etching (RIE) using the top oxide layer as a mask. The trench sidewalls are then passivated by thermal oxide, and the trenches are filled with SiO$_2$ by low pressure chemical vapor deposition (LPCVD).

The trenches of the distributed Bragg reflectors 125 and 130 should be fairly smooth and vertical for optimal optical performance of the DBRs. Conventional CMOS Si processing tools may be used to obtain small roughness and high verticality.

Figure 5:
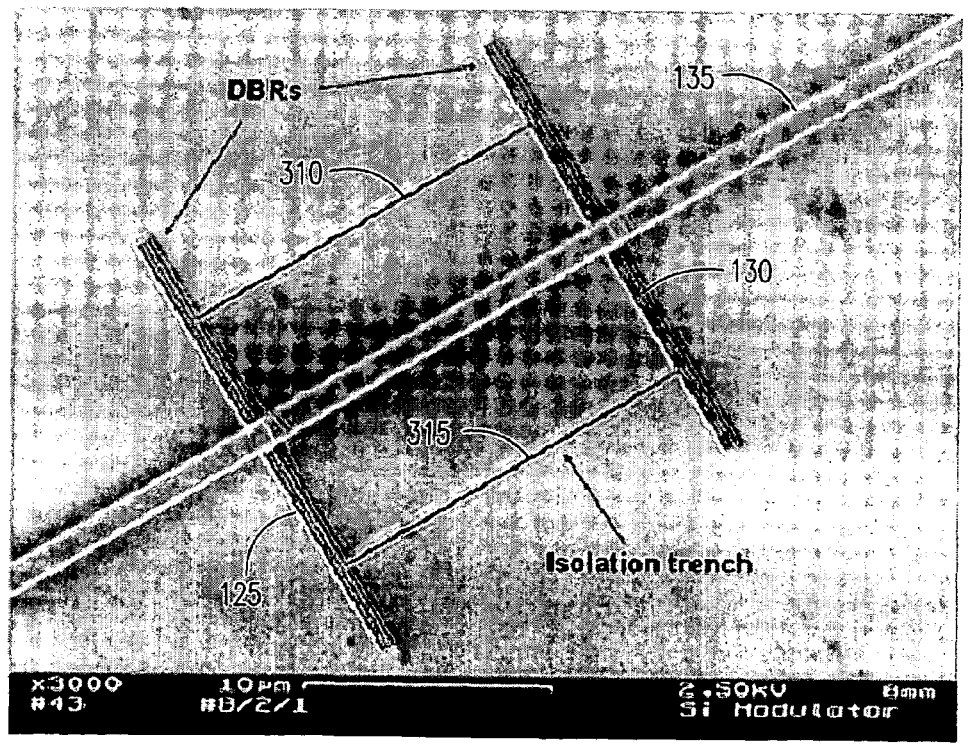
FIG. 5 is a top view provided by a Scanning Electron Microscope (SEM) photograph of a partially finished electro-optic modulator according to an embodiment of the invention.

The rib waveguide 135 is then defined with photoresist, using UV photolithography. The rib is then etched into the surface using RIE that has low selectivity between Si and SiO2. The photoresist is then removed and the etched surfaces are passivated by thermal oxide growth. FIG. 5 is a top view provided by a Scanning Electron Microscope (SEM) photograph of the device at this point in the example fabrication process. It illustrates at least the DBRs 125, 130, the isolation trenches 310 and 315, and the rib waveguide 135.

The entire surface of the device is then covered in oxide, such as by PECVD, chemical vapor deposition (CVD) or spin-on-glass (SOG) techniques. Windows are defined and etched for ion implantation. The windows may be defined using common lithographic processes, such as e-beam or UV lithography, and the etching in one embodiment comprises RIE. The doped areas 315 and 320 are formed, and ohmic contacts are produced on them. Metal pads on the ohmic contacts may be defined for final bounding.

In one embodiment, an undoped silicon layer with a background doping of n=10^15 cm^-3 is used for the diode layer between the highly doped p and n portions of the p-i-n diode. Low doping in the waveguide helps avoid free carrier absorption losses. Other possibilities, besides the p-i-n, diode for modulation, are MOS and MOSFET devices. The former produces little effect on the refractive index although it has no dc power consumption. The latter may be implemented by placing a gate electrode on top of the rib waveguide, and keeping the highly doped n and p regions (cathode and anode). The MOSFET may improve the speed operation with respect to the p-i-n case with the use of high gate voltages. Less variation of the refractive index implies a longer device (along the z-axis) in order to produce the same effect as that produced by a high refractive index change in a short device.

The DBR trenches in one embodiment, are substantially transverse or perpendicular to the rib waveguide (that is, the trenches that formed the two DBRs). The DBR trenches also define the cavity (length). Light goes back and forth between the two DBRs (each DBR acts as a mirror perpendicular to the waveguide). The lateral trenches (one at each side of the rib waveguide) parallel to the waveguide are not necessary for the cavity to work, and by placing them at a correct distance from the waveguide, they should not affect the optical (passive)

performance of the cavity. The role of the lateral trenches is essentially for electrical isolation and carrier confinement, that is, keep carriers injected from the high doped n and p regions from spreading out laterally. In this way, by using the lateral trenches, the drive current (or injected carriers) are efficiently used only in the cavity/waveguide region where they should change the refractive index. Thus, the device will operate without the trenches. If desired, other means of carrier confinement may be used.

An electrical model may utilize a commercially available two- and three-dimensional simulation package, ATLAS from SILVACO employed to achieve the electrical calculations. The program simulates internal physics and device characteristics of semiconductor devices by solving Poisson's equation and the charge continuity equations for electrons and holes numerically. The software allows a complete statistical approach (Fermi-Dirac statistics) when, for example, heavily doped regions are considered. Carrier recombination models include Shockley-Read-Hall (SRH) recombination, Auger recombination and surface recombination. A concentration and temperature dependent model has been used to model the carrier mobility. The simulation package also includes thermal modeling, which accounts for Joule heating, heating and cooling due to carrier generation and recombination, and the Peltier and Thomson effects. The heat flow equation is solved for specific combination of heat sink structures, thermal impedances and ambient temperatures.

In simulations, a carrier concentration dependent SRH recombination model may be employed, with an estimated carrier lifetime in the Si device layer (intrinsic region) of electrons and holes of $\tau_n=700$ ns and $\tau_p=300$ ns, respectively, for a n-type doping concentration of $10^{15}$ cm$^{-3}$. Ohmic contacts without additional contact resistance or capacitance may be assumed. In addition, the electrical contacts (electrodes) may be considered to act as thermal contacts (heat sinks) at a fixed temperature of 300 K.

A finite-difference time-domain (FDTD) method and transfer matrix method (TMM) may be used for optical analysis of the DBRs and F-P cavity. From the values of the electron and hole concentrations at any point of the p-i-n/cavity region, the induced real refractive index and optical absorption coefficient variations ($\Delta n$ and $\Delta \alpha$, respectively) at a wavelength of 1.55 μm produced by free-carrier dispersion (highly-doped regions and carrier injection in the cavity) are calculated by using:

$$\Delta n = \Delta n_e + \Delta n_h = -[8.8 \times 10^{-22} \cdot \Delta N + 8.5 \times 10^{-18} \cdot (\Delta P)^{0.8}] \quad [1]$$

$$\Delta \alpha = \Delta \alpha_e + \Delta \alpha_h = 8.5 \times 10^{-18} \cdot \Delta N + 6.0 \times 10^{-18} \cdot \Delta P \quad [2]$$

where $\Delta n_e$ is the refractive index change due to electron concentration change;

$\Delta n_h$ is the refractive index change due to hole concentration change;

$\Delta N$ is the electron concentration change in cm$^{-3}$;

$\Delta P$ is the hole concentration change in cm$^{-3}$;

$\Delta \alpha_e$ (in cm$^{-1}$) is the absorption coefficient variations due to $\Delta N$;

$\Delta \alpha_h$ (in cm$^{-1}$) is the absorption coefficient variation due to $\Delta P$.

Diffraction losses and material optical absorption may be calculated with the FDTD method. The fundamental mode of the waveguide is launched at the input and the reflected (R) and transmitted (T) powers are recorded by virtual detectors. Losses (A) are obtained by using the relation R+T+A=1. Scattering losses, due to surface roughness, are neglected. A one-dimensional (1-D) (along the propagation direction) model may be used based on the TMM to calculate the transmission and reflection spectra of the structure. The effect of the transverse and lateral geometry of the structure, the diffraction and the absorption are considered in the 1-D model by using an equivalent complex effective refractive index obtained from the three-dimensional FDTD calculations of the entire structure for a short cavity length ($\lambda_p/2n_{Si}$, where $\lambda_p=1.55$ μm and $n_{Si}$ is the effective refractive index of the Si region). The purpose of using this technique is to simplify the calculations by employing a flexible model that allows predicting the optical performance of the device for different design parameters in a shorter time.

Both electron (N) and hole (P) concentrations in the cavity region are nearly equal for forward bias voltages between 0.8 V and 1.1 V, assuming a surface recombination velocity of $10^2$ cm/s at the interface between the Si cavity and the surrounding SiO$_2$. This surface recombination velocity may correspond to Si surfaces passivated with thermally grown SiO$_2$. The p-i-n diode operates under high injection condition within the considered forward bias voltage range. The injected carrier distribution is highly uniform throughout the central region of the cavity. This result simplifies the optical calculations since the spatial distribution of the refractive index and absorption coefficient in the cavity when carriers are injected in the guiding region can be considered uniform.

A carrier concentration of $N=P=3 \times 10^{17}$ cm$^{-3}$ is predicted for a forward bias of 0.87 V which induces a real refractive index change of $\Delta n = -10^{-3}$ [Eq. 1] and an absorption coefficient variation of $\Delta \alpha = 4.35$ cm$^{-1}$ [Eq. 2].

Simulations show that some of the injected free carriers into the low-doped n-type Si layer spread laterally away from the central guiding region as the distance between the lateral trenches ($W_{pin}$) is increased. This leads to a leakage current component that increases the necessary dc power in order to obtain the targeted carrier concentration (refractive index change) in the central guiding region. Particularly, the dc power consumption for $W_{pin}$ equal to 4.5, 8 and 12 μm was calculated to be 0.81, 1.51 and 2.27 μW per μm length, respectively, for a free carrier concentration in the cavity of $3 \times 10^{17}$ cm$^{-3}$. That is, the dc power increases 180% when $W_{pin}$ is varied from 4.5 μm to 12 μm, indicating the need to confine carriers in the guiding region in order to reduce the drive dc power.

Hereafter, a $W_{pin}$ value of 8 μm is assumed as a compromise between low power consumption and good optical properties. In the same way as occurs in the lateral direction (x-axis), carriers may diffuse along the longitudinal direction (z-axis) if no carrier confinement means are accounted. By using lateral and longitudinal trenches down to the BOX layer, electrical isolation of the cavity is achieved along all directions leading to injection carrier confinement in the central guiding region, suppressing the leakage current due to carrier spreading.

Table I shows the drive current density (J), percentage of the current component due to surface recombination ($J_s$) to the total current (J), dc power ($P_{dc}$) and free-carrier concentration (N, P) in the central region of the cavity for the aforementioned surface recombination velocities. The current density is defined as the total injection current divided by the longitudinal cross-section area of the cavity at the middle (x=0). In all the cases, a forward voltage of 0.87 V and a cavity length of 1 μm are assumed. As expected, it is seen that the injection current and electrical power increase as the surface recombination velocity is increased. For case (b) the injection current component due to surface recombination (leakage current) represents 28.1% of the total current, whereas this leakage component reaches a significant 98.5% of the total injected current for case (c). The dissipated power for case (b) increases by 32.4% as compared to case (a), as a consequence of leakage current via surface recombination; nevertheless, the total drive power is kept to a low value.

TABLE I

| $S_p$, $S_n$ (cm/s) | J (A/cm²) | $J_s/J$ (%) | $P_{dc}$ (µW) | N, P (cm⁻³) |
|---|---|---|---|---|
| 0 | 83.33 | 0 | 1.14 | $3 \times 10^{17}$ |
| $10^2$ | 115.86 | 28.1 | 1.51 | $3 \times 10^{17}$ |
| $10^5$ | 5514.6 | 98.5 | 71.9 | $5 \times 10^{16}$ |

These results indicate that of electrical passivation of the surfaces of the p-i-n/cavity region may be used to reduce the component of the total current due to surface recombination and, therefore, the dc power consumption. In addition, surface passivation by thermal $SiO_2$ is also advantageous from the optical point of view since it reduces the scattering losses from the surface. Hereafter, a surface recombination velocity of $S_p=S_n=10^2$ cm/s will be assumed. For this case, the calculated increase of the device temperature was less than $10^{-2}$ K.

The effect of the contact resistance of the electrodes on the total power is not significant for a forward injection current of 1.74 µA/µm (V=0.87 V) if proper contact metallization is achieved. For example, if Co/Si contacts are assumed on both electrodes, the corresponding contact resistance values, after a rapid thermal annealing (RTA) process, on the highly doped $n^+$ and $p^+$ regions should be around $1.6 \times 10^{-7}$ $\Omega$cm² and $8.9 \times 10^{-7}$ $\Omega$cm², respectively. This means a total series resistance due to the contacts of 38.2 $\Omega$µm, which leads to a negligible increase of $1.1 \times 10^{-10}$ W/µm in dc power consumption.

An excitation voltage pulse with $V_{OFF}=0$ V (OFF-state) and $V_{ON}=0.87$ V (ON-state) may be used for the transient analysis. The duration of both OFF and ON states is 300 ns, whereas both the rise time and fall time for the voltage bias step are 0.1 ns. For the refractive index modulation, the turn-on time ($t_{ON}$) is defined as the time required for the refractive index change ($\Delta n$) to change from 10% to 90% of its maximum absolute value ($|\Delta n|$). Likewise, the turn-off time ($t_{OFF}$) is defined as the time needed for the refractive index change to vary from 90% to 10% of its maximum absolute value. The turn-on time (15.27 ns) is longer than the turn-off time (5.72 ns) in one embodiment.

The decrease of refractive index occurs because of carrier injection (forward bias) by diffusion from the highly doped regions into the intrinsic (low doped) material. This is because the characteristic length for diffusive transport in the intrinsic region, $l=(D_a \tau_{eff})^{1/2}=5.2$ µm [$D_a=18$ cm²/s is the ambipolar diffusion coefficient and $\tau_{eff}(=t_{ON})=15.27$ ns) is the effective carrier lifetime in the intrinsic region], is comparable to the lateral dimension of the device.

On the other hand, the increase of refractive index results from depletion of carriers in the central guiding region. Carrier removal is achieved by both carrier recombination and the increased electric field across the intrinsic region. A higher reverse $V_{OFF}$ would result in a shorter turn-off time since the depletion electric field is increased.

The simulations reveal that both voltage rise and fall processes lead to the appearance of current peaks for a short time interval. In particular, a remarkable reverse current peak occurs during the transition from $V_{ON}$ to $V_{OFF}$. the transient current and maximum device temperature In both cases, it is observed that the transient reverse current peak during the stepping down of the applied voltage from $V_{ON}=0.87$ V to $V_{OFF}=0$ V and −5V, ($2 \times 10^{-3}$ and $1 \times 10^{-3}$ A/µm for $V_{OFF}=-5$V and $V_{OFF}=0$V, respectively) is around three orders of magnitude higher than the corresponding steady-state current (1.74 µA/µm), and the maximum current for $V_{OFF}=-5$V is twice higher than that reached for $V_{OFF}=0$V. The higher the reverse VOFF, the shorter becomes the rise time and the larger the transient current peak.

This leads to an appreciable increase of the device temperature, around 1K for $V_{OFF}=-5$V. For $\lambda=1.55$ µm the thermal change of refractive index of silicon is $\partial n/\partial T=+1.86 \times 10^{-4}$ K⁻¹. That is, a maximum temperature increase of 1 K corresponds to an increase of the refractive index of $+1.86 \times 10^{-4}$, which is one order of magnitude smaller than that induced by the free-carrier dispersion ($\Delta n=-10^{-3}$). Therefore, the thermo-optic effect for both $V_{OFF}=0$V and $V_{OFF}=-5$V is predicted to be not significant.

Another factor that could limit the switching time of the device is the photon lifetime in the F-P cavity. The photon lifetime ($\tau_{ph}$) corresponds to the time for the stored energy in the cavity to vanish after the external supply is shut off. However, the photon lifetime values for the considered device configurations are calculated to be on the order of tens to hundreds of ps, that is, much shorter than the switching times obtained in the electrical transient analysis. Therefore carrier diffusion, for the turn-on time, and carrier depletion, for the turn-off time, should be pointed out as the switching speed limiting factors in the device under study.

It must be noted that a larger value of $W_{pin}$ would increase the switching time ($t_s$) since the refractive index must be changed (carrier injection and depletion) in a larger volume. For example, the calculated $t_s$ for $W_{pin}=12$ µm, $V_{ON}=0.87$ V and $V_{OFF}=-5$ V is predicted to be 18.56 ns, that is, 17.7% larger than that calculated for $W_{pin}=8$ µm.

Simulations show single-mode operation in the SOI rib waveguide for both TE and TM polarization modes, for $h_{rib}=0.45$ µm, $w_{rib}=1.5$ µm and $h_d=1.5$ µm. The distance between the lateral trenches, $W_{pin}=8$ µm, was chosen in order to minimize the optical mode mismatch between the DBR and the cavity region, as well as the power consumption and switching time. FIG. 4 shows the intensity profile of the propagating fundamental TE mode ($TE_{00}$) for $W_{pin}=8$ µm. The overlap integral between the $TE_{00}$ mode in the cavity region and $TE_{00}$ mode in the DBR region was calculated to be 99.99%. Lower $W_{pin}$ values may lead to unstable single mode operation. The free-carrier absorption losses of the propagating mode due to the highly-doped $p^+$ and $n^+$ regions were found to be negligible because of the small overlap between these regions and the optical mode. Free-carrier absorption losses due to carrier injection [ON state (N=P=$3 \times 10$ cm⁻³)] were calculated to be 20.6 dB/cm.

The lengths of the Si and $SiO_2$ regions of the DBRs were chosen according to the condition $n_{Si}L_{Si}+n_{ox}L_{ox}=\lambda_p/2$, where $n_{Si}$ and $n_{ox}$ are the effective refractive indeces of the Si and $SiO_2$ regions, respectively, and $\lambda_p=1.55$ µm. Particularly, we chose $L_{Si}=160$ nm and $L_{ox}=150$ nm, which lead to an optical path $n_{ox}L_{ox}$ smaller than $n_{Si}L_{Si}$ in order to minimize diffraction losses. The calculated reflectivity spectrum for the $TE_{00}$ mode of a 6 Si/$SiO_2$-period DBR indicated a stop-band of ~800 nm and a maximum reflectivity of 98.7% (transmittivity=0.57% and diffraction losses=0.73%).

The modulation depth (M) is defined as:

$$M = 1 - \frac{T_{MIN}}{T_{MAX}} = \frac{P_{OFF} - P_{ON}}{P_{OFF}} \quad (3)$$

where $T_{MAX(MIN)}$ is the maximum(minimum) transmittivity, i.e., the ratio between the output in the OFF(ON)-state and the input power, $P_{OFF}$ is the output optical power from the device when there is no free-carrier injection (OFF-condition), and $P_{ON}$ is the output optical power from the modulator when plasma injection occurs into the cavity (ON-condition). Hereafter, the maximum transmittivity will be called just transmittivity (T). The output optical power is calculated at $\lambda_p=1.55$ μm (probe wavelength), which corresponds to a cavity resonance wavelength in the OFF-condition.

Table II shows the full width at half maximum (FWHM) of the spectral intensity (Δλ) of the resonance peak at 1.55 μm, modulation depth (M), transmittivity (T) and dc dissipated power ($P_{dc}$) for different cavity lengths and number of DBR periods.

TABLE III

| $L_{cav}$ (μm) | periods | Δλ (nm) | M (%) | T (%) | $P_{dc}$ (μW) |
|---|---|---|---|---|---|
| 5.684 | 3 | 1.275 | 27.6 | 86.3 | 7.8 |
| ($25\lambda_p/2n_{Si}$) | 4 | 0.396 | 82.3 | 59.3 | |
| | 5 | 0.170 | 93.8 | 21.4 | |
| 9.074 | 3 | 0.807 | 50.3 | 86.3 | 12.3 |
| ($40\lambda_p/2n_{Si}$) | 4 | 0.251 | 89.8 | 59.3 | |
| | 5 | 0.108 | 98.4 | 21.4 | |
| 18.117 | 3 | 0.408 | 80.8 | 86.3 | 24.5 |
| ($80\lambda_p/2n_{Si}$) | 4 | 0.127 | 97.7 | 59.3 | |
| | 5 | 0.055 | 99.6 | 21.4 | |
| 22.638 | 3 | 0.327 | 86.8 | 86.3 | 30.6 |
| ($100\lambda_p/2n_{Si}$) | 4 | 0.102 | 98.5 | 59.3 | |
| | 5 | 0.044 | 99.7 | 21.4 | |

A refractive index change in the cavity of $\Delta n=-10^{-3}$ is assumed. It is seen that (i) the modulation depth increases and (ii) the transmittivity decreases as the number of periods is increased for a given cavity length, (i) is due to the increase of the resonance peak sharpness (decrease of Δλ) as a consequence of the increase of the DBRs reflectivity, (ii) is originated by the increase of the diffraction losses.

Intensity attenuation transmission characteristics of the device in the ON- and OFF-state for a 80($\lambda_p/2n_{Si}$)-long cavity with 3-period and 4-period DBRs due to the injected carriers in the ON-sate may be observed. Although the use of a specific configuration may depend on the specific application, a good trade-off between modulation depth (80%) and transmittivity (86%) is obtained for a ~18-μm-long cavity with 3-period DBRs, which represents a total device length of ~20 μm. It must be noted the low values of the electrical power shown in Table III as well as the small refractive index change in the cavity (0.1%) required to achieve high modulation depths.

Producing high aspect ratio trenches on SOI with high verticality may be performed using current semiconductor fabrication techniques. Nevertheless, deviations from the considered dimensions of the optical structure (length of the DBRs and cavity) due to fabrication tolerances may affect the predicted device performance. The effect of fabrication errors on the spectral transmittance may be estimated by calculating the transmittivity spectra for different length deviations of the structure using the effective index method together with the TMM, and calculating their average. Spectral transmittivity for a 3-period DBR with a maximum length deviation of 20 nm (that is, $L_{Si}$=160±10 nm, $L_{ox}$=150±10 nm and $L_{cav}$=18.097±0.10 μm), 10 nm and 5 nm may result in degraded resonance peak shape. The length deviation of the DBR and cavity was assumed to be the same and the period of the DBR constant. The resonance peak shape becomes degraded as the length deviation increases. This is mainly due to the variations of the cavity length, which shift the resonance wavelength for each length component, broadening the averaged resonance peak. As a consequence, the transmitivitty is considerably reduced as compared to the ideal case. It is also observed that high modulation depths can still be achieved (~72% at 1.5508 μm wavelength for a 20 nm length deviation). Simulations show that if the considered length variations occur only in the DBR regions, the transmission spectrum is not significantly affected with respect to the ideal case.

The performance of a new planar silicon electro-optic modulator based on a F-P microcavity by deep high-index-contrast Si/SiO$_2$ Bragg reflectors and confinement of free carrier plasma dispersion in a SOI rib waveguide has been analyzed. Free carrier concentration change in the cavity region produced by an integrated lateral p-i-n diode induces a refractive index change that modulates the output power at 1.55 μm wavelength. Deep lateral trenches in the p-i-n/cavity region laterally confine the injected carriers into the cavity. Deep Si/SiO$_2$ DBRs confine longitudinally (i) the free carriers and (ii) the optical field into the cavity region. The device has been analyzed by using electrical and optical models. Analysis shows that a distance of $W_{pin}$=8 μm between the cavity lateral trenches permits to minimize 0) the dc electrical power and switching time of the device, and (jj) the mode mismatch between the cavity and the DBRs. Electrical passivation of the cavity surfaces with thermal SiO$_2$ ($S_p=S_n=10^2$ cm/s) is predicted to reduce the leakage current due to surface recombination by 70% as compared to a non-passivated surface cavity ($S_p=S_n=10^5$ cm/s), without significantly affecting the injection carrier concentration as compared to the case of no surface recombination ($S_p=S_n$=0 cm/s). Diffraction is found to be the main cause of optical power losses in our device for $\Delta n=-10^{-3}$ in the cavity. Calculations show that a trade-off between modulation depth and transmittivity of the device must be considered.

A 20-μm-long device with $S_p=S_n=10^2$ cm/s, $W_{pin}$=8 μm and electrical contacts acting as heat sinks is predicted to exhibit ~80% of modulation depth with a transmittivity of ~86% at 1.55-μm operation wavelength by using ~25 μW of electrical power and a drive current density of 116 A/cm$^2$ under dc operation, leading to an increase of the device temperature <$10^{-2}$ K. The switching speed of this device is calculated to be ~16 ns for $V_{ON}$=0.87 V and $V_{OFF}$=−5 V, with no significant thermo-optic effect. The estimated dc power consumption for this device may be at least one order of magnitude smaller than the smallest currently reported (theoretical) value. These characteristics reveal the benefits of confining both the optical field and the injection carriers in the cavity region in order to improve the electro-optic modulator performance in terms of power consumption, current density, device length and modulation depth. Si CMOS process compatibility makes this device very promising for low-cost and low-power silicon-based integrated photonic systems-on-a-chip (PSOC) for low frequency applications such as local area networks, fiber-to-home return links, interconnects, and sensor systems for chemical and biochemical applications.

The invention claimed is:

1. An electro-optic modulator comprising:
    a silicon waveguide;
    an optical resonant silicon cavity optically coupled to the waveguide;
    a p+ doped area formed on a first side of the optical resonant cavity; and
    an n+ doped area formed on a second side of the optical resonant cavity such that the optical resonant cavity forms an intrinsic, non-active region of a P-I-N diode.

2. The electro-optic modulator of claim 1 wherein carriers are injected into the optical resonant cavity by applying a voltage across the p+ and n+ doped areas to change the resonant frequency of the optical resonant cavity.

3. The electro-optic modulator of claim 1 wherein the n+ and p+ areas are electrically isolated.

4. The electro-optic modulator of claim 3 and further comprising lateral trenches formed adjacent the n+ and p+ areas.

5. The electro-optic modulator of claim 3 wherein the n+ and p+ areas are formed on an insulator.

6. The electro-optic modulator of claim 1 wherein the optical resonant cavity comprises orthogonal trenches formed at both ends of the optical resonant cavity to reflect light back into the optical resonant cavity.

7. The electro-optic modulator of claim 1 wherein the injection of carriers into the optical resonant cavity by applying a voltage across the p+ and n+ doped areas changes the concentration of free carriers in the optical resonant cavity.

8. The electro-optic modulator of claim 7 wherein the concentration of free carriers in the optical resonant cavity is changed without significant heating of the cavity.

9. The electro-optic modulator of claim 1 wherein optical resonant cavity comprises a planar micro cavity.

10. The electro-optic modulator of claim 9 wherein the planar micro cavity comprises a rib waveguide.

11. The electro-optic modulator of claim 10 wherein the optical resonant cavity comprises a distributed Bragg reflector formed at both ends of the rib waveguide.

12. An electro-optic modulator comprising:
a silicon optical resonant cavity having free carriers; and
means for controlling the concentration of free carriers in the optical resonant cavity to vary the refractive index of the optical resonant cavity.

13. The electro-optic modulator of claim 12 wherein the means for controlling the concentration of free carriers in the optical resonant cavity comprises a p+ doped area and a n+ doped area on opposite sides of the optical resonant cavity such that a p-i-n diode is formed with the optical resonant cavity comprising the intrinsic region of the p-i-n diode.

14. The electro-optic modulator of claim 13 wherein carriers are injected into the optical resonant cavity by applying a voltage across the p+ and n+ doped areas changes the resonant frequency of the optical resonant cavity.

15. The electro-optic modulator of claim 13 wherein the n+ and p+ areas are electrically isolated.

16. The electro-optic modulator of claim 15 and further comprising lateral trenches formed adjacent the n+ and p+ areas.

17. The electro-optic modulator of claim 15 wherein the n+ and p+ areas are formed on an insulator.

18. The electro-optic modulator of claim 12 wherein the optical resonator cavity further comprises orthogonal trenches formed at both ends of the optical resonator cavity to reflect light back into the optical resonator cavity.

19. The electro-optic modulator of claim 12 wherein the injection of carriers into the optical resonator cavity by applying a voltage across the p+ and n+ doped areas changes the concentration of free carriers in the optical resonator cavity.

20. The electro-optic modulator of claim 19 wherein the concentration of free carriers in the optical resonator cavity is changed without significant heating of the cavity.

21. The electro-optic modulator of claim 13 wherein optical resonator cavity comprises a planar micro cavity.

22. The electro-optic modulator of claim 21 wherein the planar micro cavity comprises a rib waveguide.

23. The electro-optic modulator of claim 22 wherein the optical resonator cavity comprises a distributed Bragg reflector formed at both ends of the rib waveguide.

24. An electro-optic modulator comprising:
a waveguide;
an optical resonant cavity having a rib waveguide formed on an insulator optically coupled to the waveguide and formed with a pair of optical reflectors coupled to each end of the rib waveguide;
a p+ doped area formed on a first side of the rib waveguide; and
an n+ doped area formed on a second side of the rib waveguide such that the rib waveguide forms a non-active "i" portion of a P-I-N diode adapted to modulate carrier concentration within the optical resonant cavity to modulate light, provided by the waveguide from an external source, within the optical resonant cavity.

25. An electro-optic modulator for modulating light from an external source, the modulator comprising:
a waveguide;
an external source of light optically coupled to the waveguide;
an optical resonant cavity optically coupled to the waveguide to receive light from the external source;
a p+ doped area formed on a first side of the optical resonant cavity; and
an n+ doped area formed on a second side of the optical resonant cavity such that the optical resonant cavity forms an intrinsic, non-active region of a P-I-N diode.

\* \* \* \* \*